United States Patent
Katsis et al.

(10) Patent No.: US 8,450,941 B2
(45) Date of Patent: May 28, 2013

(54) SYSTEMS AND METHODS FOR DYNAMIC POWER MANAGEMENT FOR USE WITH A VIDEO DISPLAY DEVICE

(75) Inventors: Dimitrios Katsis, Emeryville, CA (US); Barry Concklin, San Jose, CA (US); Daryl Chamberlin, San Jose, CA (US); Peter J. Mole, St. Albans (GB)

(73) Assignee: Intersil Americas Inc., Milpitas, CA (US)

( * ) Notice: Subject to any disclaimer, the term of this patent is extended or adjusted under 35 U.S.C. 154(b) by 260 days.

(21) Appl. No.: 13/013,700

(22) Filed: Jan. 25, 2011

(65) Prior Publication Data

US 2012/0153861 A1 Jun. 21, 2012

Related U.S. Application Data

(60) Provisional application No. 61/424,602, filed on Dec. 17, 2010.

(51) Int. Cl.
*H05B 37/02* (2006.01)
(52) U.S. Cl.
USPC .......................................... 315/291; 315/308
(58) Field of Classification Search
CPC ...................................................... H05B 37/02
USPC ................ 315/291, 294, 297, 299, 307, 308; 341/144; 353/85
See application file for complete search history.

(56) References Cited

U.S. PATENT DOCUMENTS

| | | | |
|---|---|---|---|
| 5,414,280 A | 5/1995 | Girmay | |
| 6,255,707 B1 | 7/2001 | Blysma et al. | |
| 6,807,202 B1 | 10/2004 | Plamper et al. | |
| 7,106,769 B2 | 9/2006 | Farigrieve | |
| 8,058,817 B2 * | 11/2011 | Lipcsei et al. | 315/297 |
| 8,115,414 B2 * | 2/2012 | Zhao et al. | 315/299 |
| 2008/0252222 A1 * | 10/2008 | Cusinato et al. | 315/161 |
| 2008/0297067 A1 * | 12/2008 | Wang et al. | 315/294 |
| 2010/0013412 A1 * | 1/2010 | Archibald et al. | 315/294 |

FOREIGN PATENT DOCUMENTS

| | | |
|---|---|---|
| EP | 1039597 | 9/2009 |
| WO | WO 02/13340 | 2/2002 |
| WO | WO 2004/095654 | 11/2004 |

* cited by examiner

*Primary Examiner* — Thuy Vinh Tran
(74) *Attorney, Agent, or Firm* — Vierra Magen Marcus LLP (57) ABSTRACT

Embodiments of the present invention relate to methods and circuits for use with a system including a light emitting element (e.g., a laser diode or light emitting diode) that is driven by a current produced by a current output digital-to-analog converter (DAC), wherein the light emitting element or the DAC is powered by a supply voltage produced by a voltage supply. In accordance with an embodiment, a measure indicative of a voltage at an output of the DAC is obtained, wherein the voltage at the output of the DAC is indicative of a voltage headroom available for the DAC. The measure indicative of the voltage at the output of the DAC is compared to one or more predetermined references, and the supply voltage is controlled based on the comparison(s).

30 Claims, 7 Drawing Sheets

SYSTEMS AND METHODS FOR DYNAMIC POWER MANAGEMENT FOR USE WITH A VIDEO DISPLAY DEVICE

PRIORITY CLAIM

This application claims priority under 35 U.S.C. 119(e) to U.S. Provisional Patent Application No. 61/424,602, entitled SYSTEMS AND METHODS FOR DYNAMIC POWER MANAGEMENT FOR USE WITH A VIDEO DISPLAY DEVICE, filed Dec. 17, 2010, which is incorporated herein by reference.

BACKGROUND

Figure 1A:
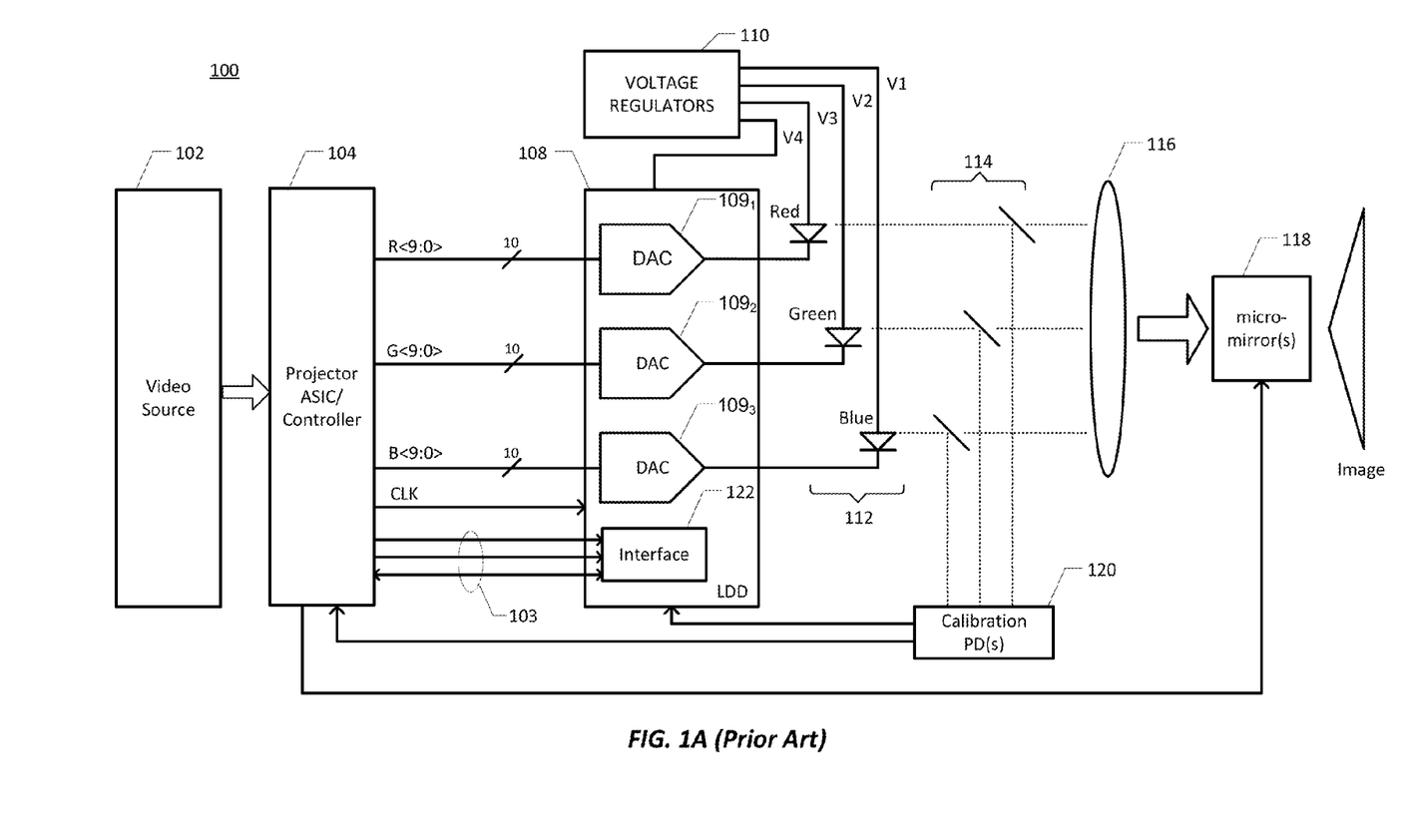
FIGS. 1A and 1B are high level block diagrams of exemplary miniature projector display devices, sometimes referred to as picoprojectors.

FIG. 1A illustrates an exemplary miniature projector display device 100, sometimes referred to as a picoprojector. The miniature projector device 100 can be integrated with or attached to a portable device, such as, but not limited to, a mobile phone, a smart phone, a portable computer (e.g., a laptop or netbook), a personal data assistant (PDA), or a portable media player (e.g., DVD player). The miniature projector device 100 can alternatively be integrated with or attached to a non-portable device, such as a desktop computer or a media player (e.g., a DVD player), but not limited thereto. The miniature projector device 100 can also be used in television applications, digital picture frame applications, as well as other applications.

Referring to FIG. 1A, the projector display device 100 is shown as including a video source 102, a controller 104 (e.g., an application specific integrated circuit and/or a micro-controller), a laser diode driver (LDD) 108 and voltage regulators 110. Depending on the type of video source, a video analog-front-end (AFE) (not shown) can be included between the video source 102 and the controller 104, and the video AFE may include, e.g., one or more analog-to-digital converters (ADCs). However, a video AFE may not be needed where the video source is a digital video source. The controller 104 can perform scaling and/or pre-distortion of video signals before such signals are provided to the LDD 108. The voltage regulators 110 can convert a voltage provided by a voltage source (e.g., a battery or AC supply) into the various voltage levels (e.g., four voltage levels V1, V2, V3 and V4) for powering the various components of the projector display device 100. The voltage regulators 110 can include, e.g., four DC-DC converters, each one of which produces a different one of the four voltage levels V1, V2, V3 and V4.

The LDD 108 is shown as including three current output digital-to-analog converters DACs $109_1$, $109_2$ and $109_3$ (which can be collectively referred to as DACs 109, or individually can be referred to as a DAC 109). The LDD is also shown as including a serial interface 122 which may receive, via a serial bus 103, a serial enable (SEN) signal and a serial clock signal (SClk) from a serial interface of the controller 104. Additionally, a bi-directional serial data input/output (SDIO) line of the serial bus 103 allows the controller 104 to write data to and read data from registers within the LDD 108. Alternative serial buses and interfaces can be used, such as, but not limited to, an Inter-Integrated Circuit (I2C) bus or a Serial Peripheral Interface (SPI) bus and interface. The LDD 108 also includes registers, and the like, which are not shown.

The current output DACs 109 of the LDD 108 drive laser diodes 112, which can include, e.g., a red, a green and a blue laser diode, but are not limited thereto. More specifically, each DAC 109 drives a current through a laser diode to cause the laser diode to emit light. Such currents can be pulled through the laser diodes (as in FIG. 1A), or pushed through the laser diodes (as in FIG. 1B). Where the LDD 108 is used to drive a red (R), a green (G) and a blue (B) laser diode, the LDD can be referred to as a RGB triple laser diode driver. The use of alternative light emitting elements, such as light emitting diodes (LEDs), etc., is also possible. Accordingly, as the term is used herein, a laser diode driver (LDD), unless stated otherwise, can drive light emitting elements including, but not limited to, laser diodes (e.g., the LDD may alternatively drive LEDs).

The light produced by the laser diodes 112 or other light emitting elements can be provided to beam splitters 114, which can direct a small percentage of the light toward one or more calibration photo-detectors (PDs) 120, and direct the remainder of the light toward projector optics 116, which include lenses, mirrors, reflection plates and/or the like. The light output by the optics 116 can be provided to one or more micro mirror(s) 118. The mirror(s) 118 can be controlled by the controller 104, or another portion of the system, to raster-scan reflected light onto a surface, e.g., a screen, a wall, the back of a chair, etc. Alternatively, the light can be directed to a liquid crystal on silicon (LCoS) display that projects the light onto a surface, e.g., a screen, a wall, etc.

Video data typically contains three primary colors, red (R), green (G) and blue (B)—which in a digital system are sent as three color data words of some length, e.g., 10-bits each in the case of certain miniature projectors. All three color data words are transferred from the controller 104 to the LDD 108 for each pixel.

The voltage drop across each laser diode 112 (for a constant current) varies with temperature and aging. Traditionally, the laser diode supply voltage for a laser diode 112 (e.g., provided by a DC-DC converter type voltage regulator) is set for the worst case voltage drop across the laser diode 112 to ensure that there is enough voltage headroom available for the current output DAC 109 to drive the laser diode 112 under the worst case conditions. This leads to a higher supply voltage than is necessary for non-worst case conditions, and thus, wasted power. In a battery powered portable device, this is undesirable.

Figure 1B:
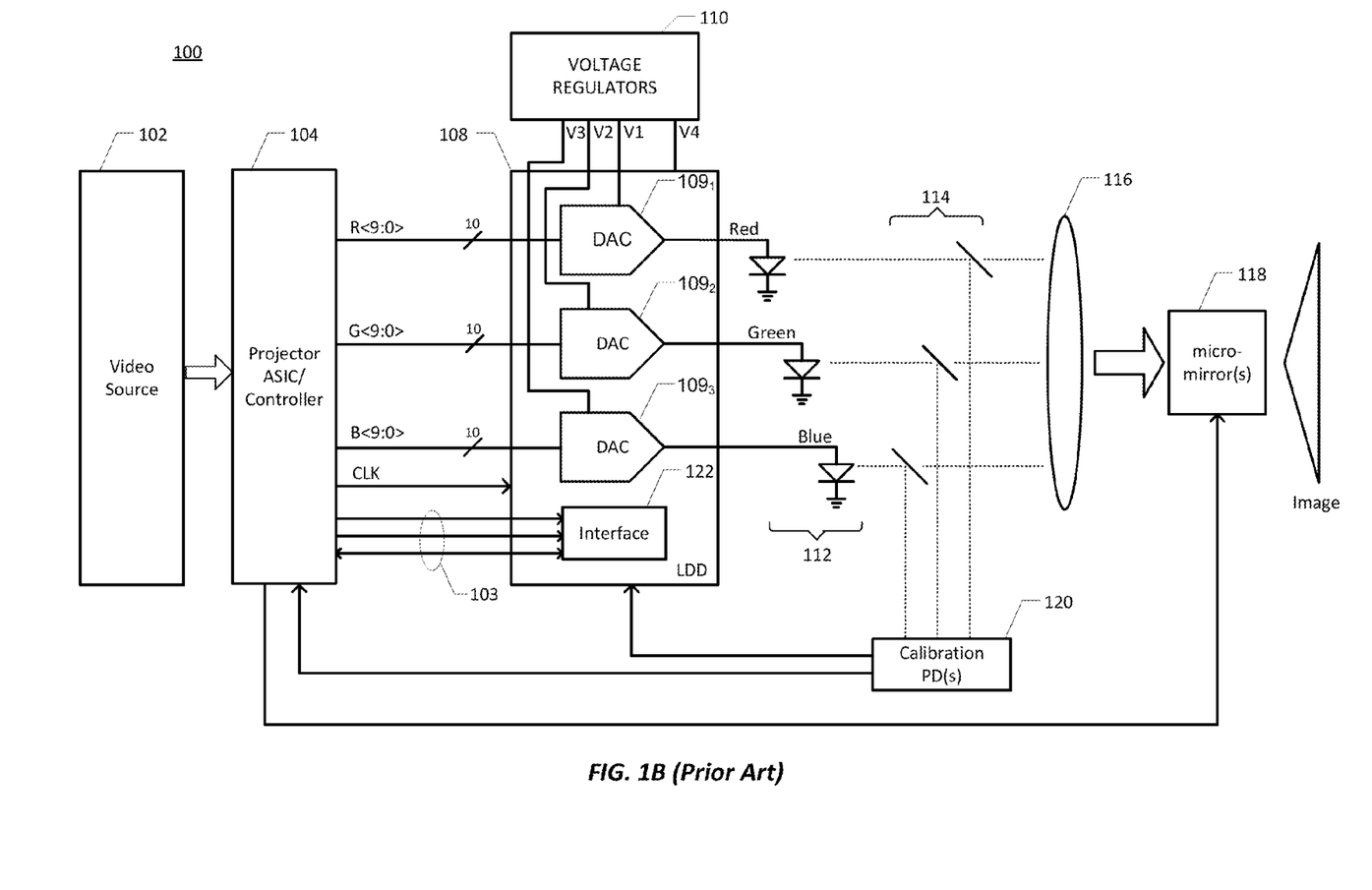

In FIG. 1A the DACs 109 are presumed to have NMOS or NPN output stages, and the outputs of the DACs 109 are shown as being connected to cathodes of the laser diodes 112 (with the anodes of the laser diodes 112 being connected to respective outputs of the voltage regulators 110). Alternatively, the DACs 109 can have PMOS or PNP output stages, and the outputs of the DACs 109 can be connected to anodes of the laser diodes 112 as shown in FIG. 1B (with the cathodes of the laser diodes 112 being connected to ground or another low voltage rail). In FIG. 1B, each DAC 109 receives a separate supply voltage produced by a separate voltage regulator 110. It is also possible that DACs include output stages that include a mixture of N-type and P-type devices.

SUMMARY

Certain embodiments of the present invention relate to methods and circuits for use with a system including a light emitting element that is driven by a current produced by a current output digital-to-analog converter (DAC), wherein the light emitting element or the DAC is powered by a supply voltage produced by a voltage supply. In accordance with an embodiment, a measure indicative of a voltage at an output of the DAC is obtained, wherein the voltage at the output of the DAC is indicative of a voltage headroom available for the DAC. The measure indicative of the voltage at the output of the DAC is compared to one or more predetermined references, and the supply voltage is controlled based on the comparison(s).

In an embodiment, the measure indicative of the voltage at the output of the DAC is compared to a predetermined reference, and the supply voltage is controlled to increase the supply voltage if the measure indicative of the voltage at the output of the DAC is less than the predetermined reference, and the supply voltage is controlled to reduce the supply voltage if the measure indicative of the voltage at the output of the DAC is greater than the predetermined reference. In accordance with a certain embodiment, when controlling the supply voltage to increase the supply voltage, an amount of the increase can be dependent on a difference between the measure indicative of the voltage at the output of the DAC and the predetermined reference. Similarly, when controlling the supply voltage to decrease the supply voltage, an amount of the decrease can be dependent on a difference between the measure indicative of the voltage at the output of the DAC and the predetermined reference.

In another embodiment, the measure indicative of the voltage at the output of the DAC is compared to a predetermined upper reference and a predetermined lower reference. In such an embodiment, the supply voltage can be controlled to increase the supply voltage if the measure indicative of the voltage at the output of the DAC is less than the predetermined lower reference, and the supply voltage can be controlled to reduce the supply voltage if the measure indicative of the voltage at the output of the DAC is greater than the predetermined upper reference. In accordance with a certain embodiment, when controlling the supply voltage to increase the supply voltage, an amount of the increase can be dependent on a difference between the measure indicative of the monitored voltage and the predetermined lower reference. Similarly, when controlling the supply voltage to decrease the supply voltage, an amount of the decrease can be dependent on a difference between the measure indicative of the monitored voltage and the predetermined upper reference.

The current produced by the current output DAC is dependent on a digital code being provided to an input of the DAC. In accordance with certain embodiments, the measure indicative of the voltage at the output of the DAC is only obtained when the digital code being provided to the input of the DAC is at least a predetermined value. This can be accomplished in various different ways. For example, in an embodiment, the digital code being provided (or about to be provided) to the input of the DAC can be monitored to thereby identify when the digital code being provided to the DAC is (or will be) at least the predetermined value, to thereby identify when the measure indicative of the voltage at the output of the DAC is to be obtained.

In certain embodiments, from time to time, the digital code provided to the input of the DAC is caused to be at least the predetermined value. Various ways of accomplishing this are described herein. For example, in certain embodiments, where light emitted by the light emitting element is used to produce a video image, the digital code provided to the input of the DAC is caused to be at least the predetermined value during blanking intervals so as to not affect the video image.

This summary is not intended to summarize all of the embodiments of the present invention. Further and alternative embodiments, and the features, aspects, and advantages of the embodiments of invention will become more apparent from the detailed description set forth below, the drawings and the claims.

DETAILED DESCRIPTION

In accordance with an embodiment of the present invention, a voltage regulator (e.g., a DC-DC converter) that is used to drive a light emitting element (e.g., a laser diode) is dynamically controlled so that a predetermined voltage headroom is provided for the current output DAC that drives the light emitting element. An implementation of this embodiment will now be explained with reference to FIG. 2A.

Figure 2A:
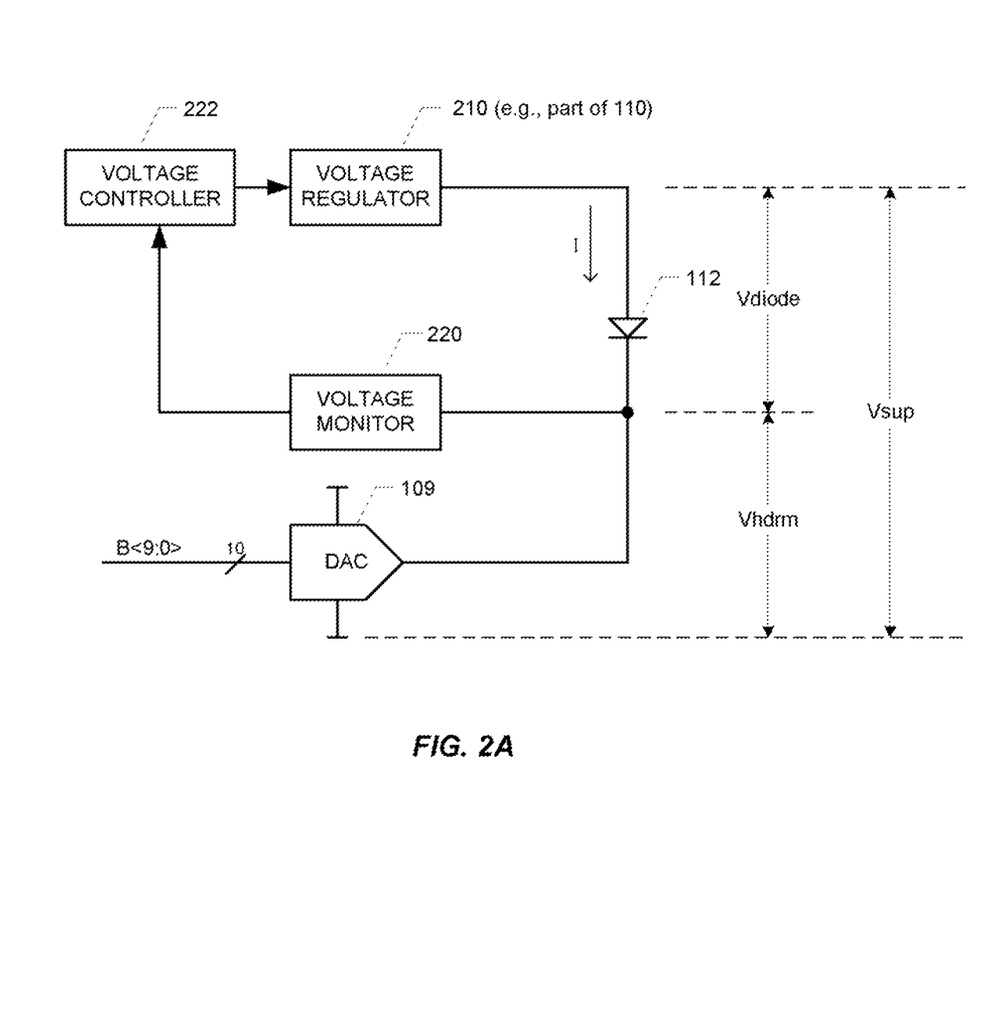
FIGS. 2A and 2B are high level block diagrams that are used to explain how supply voltages can be controlled in accordance with embodiments of the present invention.

Referring to FIG. 2A, a voltage regulator 210 (shown as a DC-DC converter) produces a supply voltage (Vsup) which is equal to a voltage drop across a laser diode 112 (Vdiode) plus a voltage headroom (Vhdrm) that enables the current output DAC 109 to operate. In other words, Vsup=Vdiode+Vhdrm. As the term is used herein, "voltage headroom" is defined as the voltage across a DAC's output stage transistor(s). As was mentioned above, a light emitting diode (LED) or other light emitting element may be used in place of the laser diode 112.

In accordance with an embodiment, for a given current (I) a voltage headroom that enables the current output DAC 109 to efficiently operate is predetermined, e.g., based on the design of the DAC, simulations of the DAC 109 and/or testing of the DAC. This predetermined voltage headroom, since it is used as a reference, can be referred to hereafter as a predetermined reference voltage headroom (Vhdrm_ref).

Still referring to FIG. 2A, a voltage monitor 220 obtains a measure indicative of a voltage at the output of the DAC 109, which is indicative of the voltage headroom available for the DAC. The voltage monitor 220 can obtain such a measure, e.g., using sample-and-hold (S/H) circuitry, an analog-to-digital converter (ADC), one or more comparators (with or without S/H circuitry) that compare the measure to one or more predetermined references, or alternative circuitry. The voltage monitor 220 and/or a voltage controller 222, compares the measure indicative of the voltage at the output of the DAC to one or more predetermined reference, including, but not limited to the predetermined reference voltage headroom (Vhdrm_ref). The voltage controller 222 controls the supply voltage (Vsup) produced by the voltage regulator 210 based on results of the comparisons. An obtained measure indicative of the voltage at the output of the DAC (which is indicative of the voltage headroom available for the DAC) can be a singled ended measure (referred to some known voltage, such as ground, e.g., as in FIG. 2A), or a differential measure (i.e. measurement of the difference between two voltages, such as a P-type DAC output voltage and Vsup, e.g., as in FIG. 2B).

In a specific embodiment, the measure indicative of the voltage at the output of the DAC is compared to a predetermined reference, such as the Vhdrm_ref, or a scaled version thereof. The voltage controller 222 can adjust the supply voltage (Vsup) produced by the voltage regulator 210, e.g., by providing appropriate signals to one or more inputs (e.g., a feedback pin) of the voltage regulator 210. The voltage controller 222 can increase the supply voltage if the measure indicative of the monitored voltage at the output of the DAC (which is indicative of the voltage headroom available for the DAC) is less than the predetermined reference, and can reduce the supply voltage if the measure indicative of the voltage at the output of the DAC is greater than the predetermined reference.

In another embodiment, the voltage controller 222 can reduce the supply voltage if the measure indicative of the monitored voltage at the output of the DAC (which is indicative of the voltage headroom available for the DAC) is at least a predetermined percentage (e.g., 5%) greater than the predetermined reference, but can increase the supply voltage as soon as the measure indicative of the monitored voltage at the output of the DAC falls below the predetermined reference. This provides for a range of monitored voltages at the output of the DAC within which there is no adjustment to the supply voltage. As will be described below, there are other ways to specify such a range.

In an embodiment, the measure indicative of the voltage at the output of the DAC is compared to both a predetermined upper reference and a predetermined lower reference. Here, the voltage controller 222 can increase the supply voltage if the measure indicative of the voltage at the output of the DAC (which is indicative of the voltage headroom available for the DAC) is less than the predetermined lower reference, and can reduce the supply voltage if the measure indicative of the voltage at the output of the DAC is greater than the predetermined upper reference.

In certain embodiments, when controlling the supply voltage to increase the supply voltage, an amount of the increase can be dependent on (e.g., proportional to, or at least correlated with) a difference between the measure indicative of the monitored voltage and the predetermined reference. Similarly, when controlling the supply voltage to decrease the supply voltage, an amount of the decrease can be dependent on (e.g., proportional to, or at least correlated with) a difference between the measure indicative of the monitored voltage and the predetermined reference. For a specific example, the greater the difference the greater the amount of increase or decrease.

The current (I) produced by a current output DAC 109 is dependent on the digital code being provided to the input of the DAC 109. Referring briefly back to FIGS. 1A and 1B, the current ($I_R$) produced by the current output DAC 109$_1$ is dependent on the red color data word (e.g., R<9:0>) provided to the input of the DAC 109$_1$. The current ($I_G$) produced by the current output DAC 109$_2$ is dependent on the green color data word (e.g., G<9:0>) provided to the input of the DAC 109$_2$. Similarly, the current ($I_B$) produced by the current output DAC 109$_3$ is dependent on the blue color data word (e.g., B<9:0>) provided to the input of the DAC 109$_3$. Regardless of whether the current output DACs 109 are pulling currents through the laser diodes 112 (as in FIG. 1A), or are pushing currents through the laser diodes 112 (as in FIG. 1B), the current output DACs 109 can be said to produce currents in dependence on the digital codes being provided to the inputs of the DACs.

The digital input codes being provided to a DAC 109 control the intensity of the light produced by the laser diode 112 connected to the output of the DAC 109. More specifically, the greater the value of the digital input code, the greater the current produced by the DAC 109, and the greater the voltage drop (Vdiode) across the laser diode 112. The greater the voltage drop (Vdiode) across the laser diode 112, the less headroom voltage (Vhdrm) available for the DAC. Accordingly, to ensure that sufficient headroom voltage (Vhdrm) is always available for the DAC regardless of the digital input code, the supply voltage can be selected taking into consideration the maximum digital input code that can be produced by the DAC.

More specifically, in accordance with certain embodiments of the present invention, the measures indicative of the voltage at the output of the DAC (which is indicative of the voltage headroom available for the DAC) are only produced when the digital code being provided to the input of the DAC is equal to the maximum input code value, or at least a predetermined value that is equal to or close to the maximum input code value. This way, the supply voltage (as adjusted by the voltage controller 222) will always provide a sufficient headroom voltage (Vhdrm) to ensure that the DAC 109 operates as intended, i.e. its output stage transistor(s) operate in the intended region (e.g. saturation for MOS transistors), generating the intended amount of current (I). While these embodiments conserve power by trimming the supply voltage to provide sufficient headroom voltage (Vhdrm) for the maximum input code value, they do not attempt to track brightness variations in the video. Other embodiments, which are described below, track brightness variations in the video in order to conserve even more power.

For those embodiments where the measures indicative of the voltage at the output of the DAC (which is indicative of the voltage headroom available for the DAC) are only produced when the digital code being provided to the input of the DAC is equal to the maximum input code value, or at least a predetermined value that is equal to or close to the maximum input code value, there are various ways to determine when the measures indicative of the voltage at the output of the DAC should be produced. In some embodiments, the digital code being provided (or about to be provided) to the input of the DAC can be monitored to thereby identify when the digital code being provided to the DAC is or will be at least the predetermined value (e.g., the maximum input code value, or a value close to the maximum input code value).

In other embodiments, the digital code provided to the input of the DAC can be modified to cause a predetermined value (e.g., the maximum input code value, or a value close to the maximum input code value) to occur from time to time, e.g., once per line, once per predetermined number of lines, once per frame, once per predetermined number of frames, once per period of time, or in response to some periodic or aperiodic event occurring, but not limited thereto. In such embodiments, the measures indicative of the voltage at the output of the DAC (which is indicative of the voltage headroom available for the DAC) are only produced when the digital code being provided to the input of the DAC is modified to be the predetermined value.

Combinations of the above embodiments are also possible. For example, the digital code being provided (or about to be provided) to the input of the DAC can be monitored to thereby identify when the digital code being provided to the DAC is or will be at least the predetermined value (e.g., the maximum input code value, or a value close to the maximum input code value). So long as a digital code of at least the predetermined value (e.g., the maximum input code value, or a value close to the maximum input code value) is detected within a predetermined period (e.g., within a predetermined number of lines, within a frame, within a predetermined number of frames, or the like), then the measure indicative of the voltage at the output of the DAC (which is indicative of the voltage headroom available for the DAC) is produced when the digital code of at least the predetermined value is driving the DAC (i.e., being provided to the input of the DAC). However, if within the predetermined period of time the digital code of at least the predetermined value is not detected, then the digital code provided to the input of the DAC can be modified to cause the predetermined value (e.g., the maximum input code value, or a value close to the maximum input code value) to occur, and the measures indicative of the voltage at the output of the DAC (which is indicative of the voltage headroom available for the DAC) is produced when the digital code of the predetermined value is driving the DAC. In such embodiments, a timer or a counter can be used to keep track of how long it's been since the digital code of at least the predetermined value (e.g., the maximum input code value, or a value close to the maximum input code value) has been used to drive the DAC, or how long it's been since the measure indicative of the voltage at the output of the DAC (which is indicative of the voltage headroom available for the DAC) has been produced. The timer or counter can be reset whenever the digital code of at least the predetermined value (e.g., the maximum input code value, or a value close to the maximum input code value) is used to drive the DAC, and/or the measure indicative of the voltage at the output of the DAC (which is indicative of the voltage headroom available for the DAC) is produced. Other variations are also possible, while being within the scope of the present invention.

In accordance with an embodiment, to ensure loop stability, a timer is used to prevent adjustment to the supply voltage for at least a predetermined (or adjustable) period of time following a previous adjustment.

In the embodiments where the digital code provided to the input of the DAC is modified to cause a predetermined value (e.g., the maximum input code value, or a value close to the maximum input code value) to occur, such modifications should preferably be performed so as to not affect the video image (e.g., during blanking intervals). These modifications to the digital code can be performed by the LDD 108, or by the controller 104, depending upon implementation. For example, the maximum input code value, or a value close to the maximum input code value, can be stored in a register in the LDD 108, or the controller 104, and that value can be selectively provided (e.g., using switching circuitry) to the input of a DAC 109 when appropriate (e.g., during a blanking interval). There can be a separate register for storing the maximum input code value, or a value close to the maximum input code value, for each of the DACs 109, or the register can be shared by all of the DACs.

As mentioned above, the digital input codes being provided to a DAC 109 control the intensity of the light produced by the laser diode 112 connected to the output of the DAC 109. The lower the value of the digital input code, the lower the current produced by the DAC 109, and the lower the voltage drop (Vdiode) across the laser diode 112. Assuming a constant supply voltage (Vsup), the lower the voltage drop (Vdiode) across the laser diode 112, the more headroom voltage (Vhdrm) available for the DAC. This can result in substantially more headroom voltage (Vhdrm) than necessary for the DAC. To conserve power, instead of providing substantially more headroom voltage (Vhdrm) than necessary for the DAC, variations in the digital input codes are tracked so that the supply voltage (Vsup) is allowed to dip during dimly lit portions of video, or portions of the video where there is a low level of at least one of the colors. The goal here is to keep the headroom voltage (Vhdrm) as close as possible or practical to the predetermined reference voltage headroom (Vhdrm_ref).

So as to not degrade video picture quality, it is generally better to provide a little more headroom voltage (Vhdrm) than is necessary rather than to provide less headroom voltage (Vhdrm) than is necessary, the latter of which can result in blurred edges and/or inaccurate colors. Accordingly, whenever the measure indicative of the voltage at the output of the DAC is determined to be less than a predetermined reference, the supply voltage can be increased by a first amount (e.g., a relatively large amount) that will ensure that the supply voltage immediately (or at least relatively quickly), is increased to the point that the actual headroom voltage (Vhdrm) immediately (or at least relatively quickly) is as high as the predetermined reference voltage headroom (Vhdrm_ref). On the other hand, whenever the measure indicative of the voltage at the output of the DAC is determined to be greater than a predetermined reference (which can be the same or different than the other predetermined reference), it may be that the supply voltage is reduced by a second amount (e.g., a relatively small amount), which is less than the first amount. In such embodiments, the first amount and/or the second amount can be fixed, or can be dependent on a difference between the measure indicative of the monitored voltage and the corresponding predetermined reference. As mentioned above, there can be a single predetermined reference in these embodiments; or there can be a predetermined lower reference and a predetermined upper reference that define a range within which no adjustments are made to the supply voltage.

In the embodiments where the supply voltage (Vsup) is allowed to dip during dimly lit portions of video, or portions of the video where there is a low level of at least one of the colors, there are various different times that the measures indicative of the voltage at the output of the DAC (which is indicative of the voltage headroom available for the DAC) can be produced. They can be produced periodically, e.g., once per line, once per specified number of lines, once per frame, or once per specified number of frames, once per period of time, or the like. Alternatively, a peak digital code provided to a DAC 109 can be detected for a period, and the measure indicative of the voltage at the output of the DAC can be produced when that peak digital code (for the period) is driving the DAC. The peak code can be stored in a peak code register that is compared to new codes, and a new peak code can overwrite a previous peak code when appropriate, and a new measure indicative of the voltage at the output of the DAC can be produced, which is used to adjust the supply voltage (Vsup). Where the peak code is not overwritten for at least a specified period of time, the value of the peak code stored in the peak code register can be gradually reduced, while the value of the supply voltage (Vsup) is simultaneously gradually reduced.

Referring back to FIGS. 1A and 1B, the supply voltages used to power the R, G and B laser diodes 112 can be separately adjusted using the above described techniques. A separate instance of the circuitry shown in FIG. 2A or FIG. 2B can be provided for each of the DACs 109$_1$, 109$_2$ and 109$_3$. This would allow the supply voltages V1, V2 and V3 (shown in FIGS. 1A and 1B) to be adjusted at the same time. Alternatively, all or portions of the circuitry used to adjust a supply voltage can be shared in a time multiplexed manner. For example, referring to FIG. 1A, the supply voltages V1, V2 and V3 can be adjusted, one after the other, in a round robin fashion using at least some common circuitry (e.g., a common voltage monitor 220 and a common voltage controller 222).

In accordance with an embodiment, a single supply voltage produced by a single voltage regulator can be used to power more than one light emitting element, as opposed to having a separate voltage regulator and supply voltage for each separate light emitting element. For example, a supply voltage produced by one voltage regulator can be used to power the three light emitting elements 112 shown in FIG. 1A, where each of the light emitting elements is still driven by a separate DAC 109. In such an embodiment, the voltage at the output of each DAC can be monitored to determine the voltage headroom available for each of the DACs, and monitored voltages can be compared to corresponding references. If the monitored voltages are all above their corresponding references, then the supply voltage can be reduced to conserve power. However, if at least one of the monitored voltages is below its corresponding reference, the supply voltage is increased.

Figure 2B:
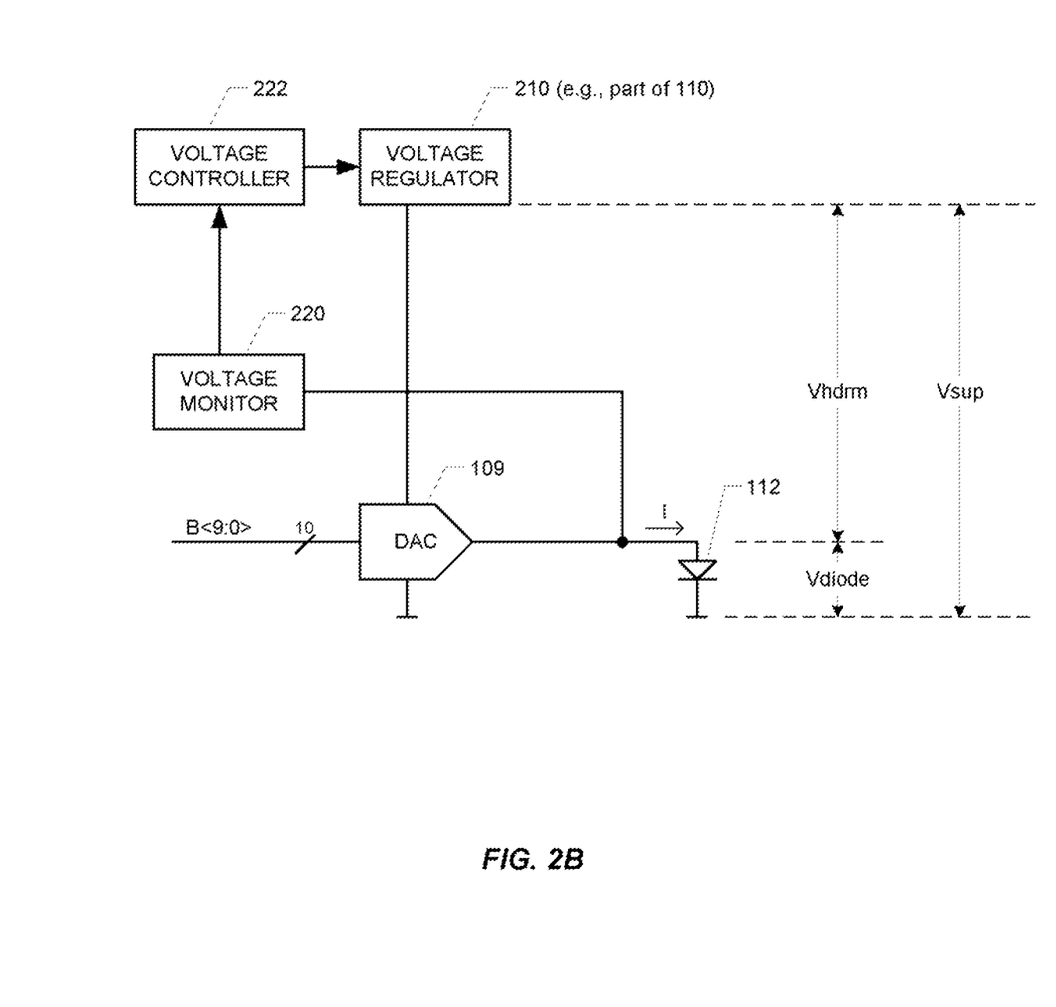

While the voltage monitor 220 and the voltage controller 222 in FIGS. 2A and 2B were shown as separate blocks, they can be combined into a single block that provides both voltage monitoring and controlling. It is also possible that the voltage controller 222, or portions thereof, be included in the voltage regulator 210 or the LDD 108.

Figure 3A:
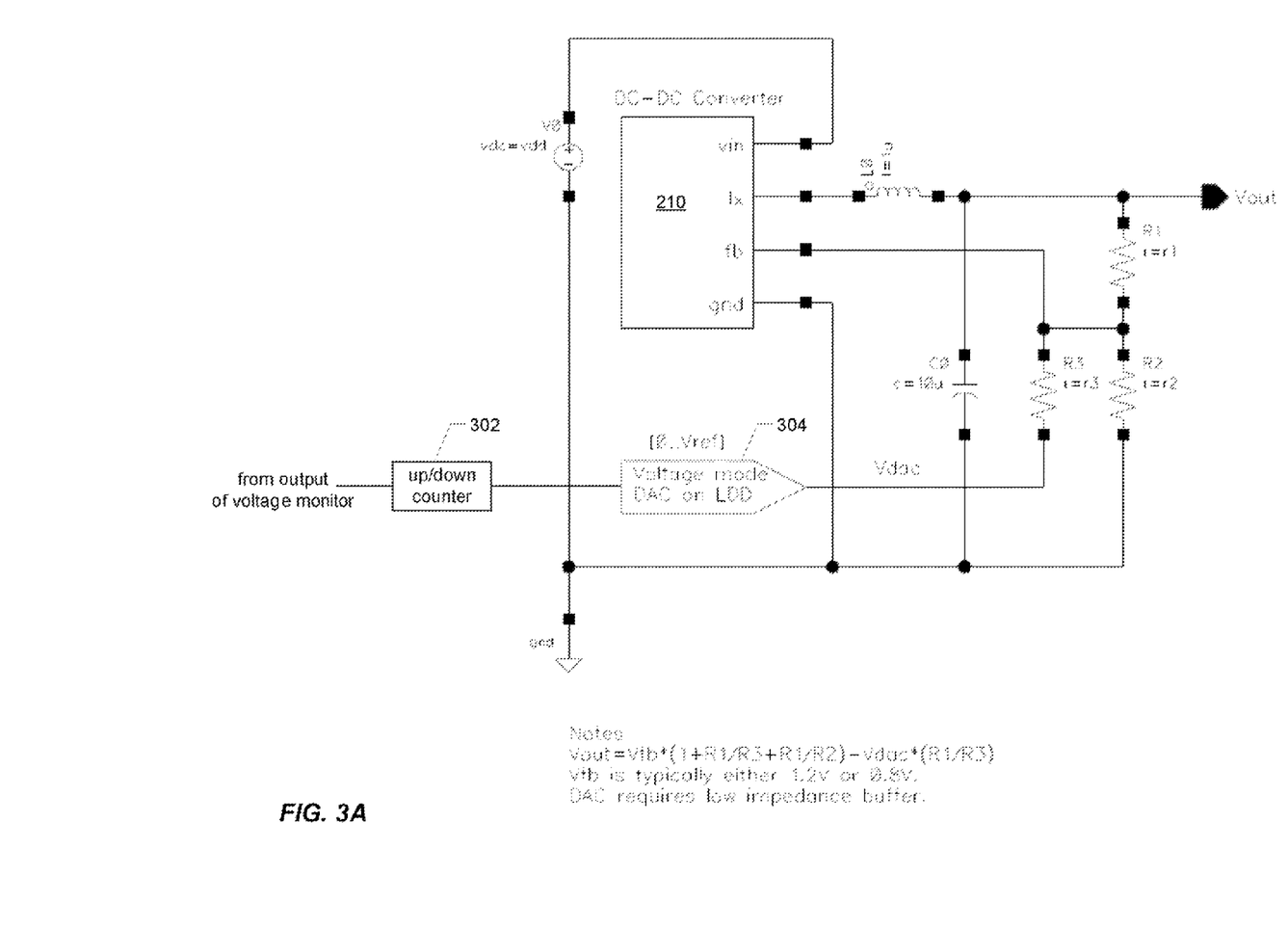
FIGS. 3A and 3B are exemplary circuit diagrams that can be used to implement the voltage controllers shown in FIGS. 2A and 2B.
Figure 3B:
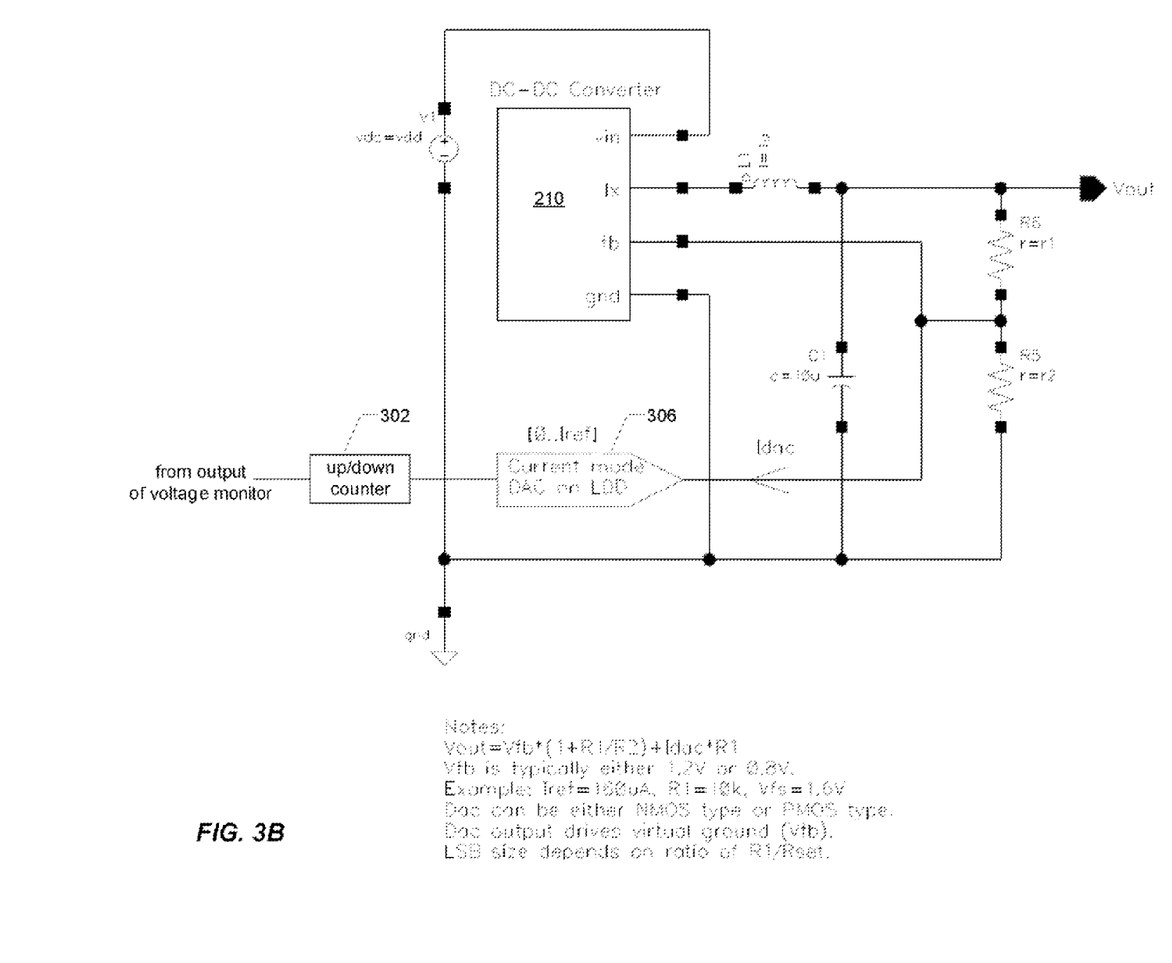

Various different types of circuitry, which can be part of the voltage monitor 220 and/or voltage controller 222, can be used to produce the measures indicative of the voltage at the output of the DAC (which are indicative of the voltage headroom available for the DAC) and to control the supply voltage (Vsup). Such circuitry can include, but is not limited to, sample-and-hold circuitry, comparators (configured to perform comparisons with one or more reference voltages), up/down counters, and the like. For example, a sampled voltage can be compared to a predetermined reference voltage by a comparator, and the output of the comparator can be used to drive an up/down counter (e.g., 302 in FIGS. 3A and 3B). The output of the up/down counter 302 (i.e., a count value) can be converted to an analog signal by a voltage mode DAC 304, and the analog output of the DAC 304 can be used to adjust an input to a feedback (fb) pin of a DC-DC converter type voltage regulator 210, e.g., as shown in FIG. 3A. Alternatively, the output of the up/down counter 302 (i.e., a count value) can be converted to an analog signal by a current mode DAC 306, and the analog signal output of the DAC 306 can be used to adjust an input to a feedback (fb) pin of a DC-DC converter type voltage regulator 210, e.g., as shown in FIG. 3B.

Exemplary voltage monitor and voltage control circuitry was described above, but was not meant to limit the scope of the present invention. One of ordinary skill in the art reading the above description would realize that myriad of alternative circuits can be used to provide the voltage monitoring and control described above while still being within the scope of the present invention. For example, there are numerous other ways to control a voltage regulator, such as through use of a serial interface.

Figure 4:
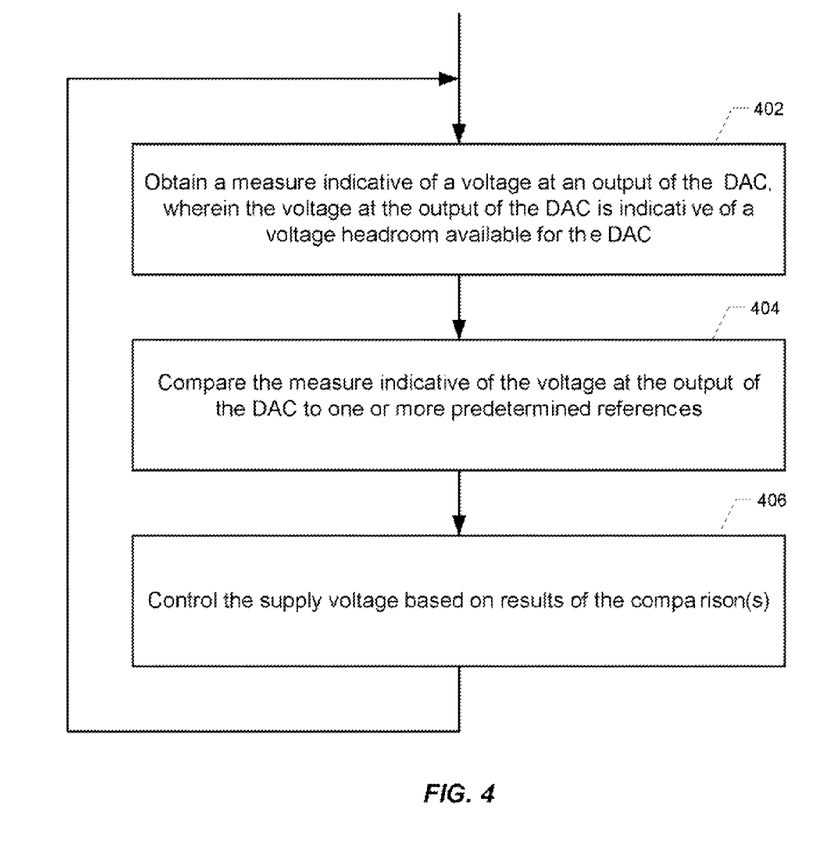
FIG. 4 is a high level flow diagram that is used to summarize various methods according to embodiments of the present invention.

FIG. 4 is a high level flow diagram that is used to summarize some of the methods described above. Such methods are for use with a light emitting element that is driven by a current produced by a current output digital-to-analog converter (DAC), wherein the light emitting element or the DAC is powered by a supply voltage produced by a voltage supply. Referring to FIG. 4, at a step 402, a measure indicative of a voltage at an output of the DAC is obtained, wherein the voltage at the output of the DAC is indicative of a voltage headroom available for the DAC. At step 404, the measure indicative of the voltage at the output of the DAC, obtained at step 402, is compared to one or more predetermined references. At step 406, the supply voltage is controlled based on results of the comparison(s) at step 404.

As was explained above, step 404 can include comparing the measure indicative of the voltage at the output of the DAC to a predetermined reference, and step 406 can include controlling the supply voltage to increase the supply voltage if the measure indicative of the voltage at the output of the DAC is less than the predetermined reference, and controlling the supply voltage to reduce the supply voltage if the measure indicative of the voltage at the output of the DAC is greater than the predetermined reference. In accordance with certain embodiments, as was described above, when controlling the supply voltage to increase the supply voltage, an amount of the increase can be dependent on a difference between the measure indicative of the voltage at the output of the DAC and the predetermined reference. Similarly, when controlling the supply voltage to decrease the supply voltage, an amount of the decrease can be dependent on a difference between the measure indicative of the voltage at the output of the DAC and the predetermined reference.

As was explained above, step 404 can alternatively include comparing the measure indicative of the voltage at the output of the DAC to a predetermined upper reference and a predetermined lower reference. In such an embodiment, step 406 can include controlling the supply voltage to increase the supply voltage if the measure indicative of the voltage at the output of the DAC is less than the predetermined lower reference, and controlling the supply voltage to reduce the supply voltage if the measure indicative of the voltage at the output of the DAC is greater than the predetermined upper reference. In accordance with a certain embodiment, when controlling the supply voltage to increase the supply voltage, an amount of the increase can be dependent on a difference between the measure indicative of the monitored voltage and the predetermined lower reference. Similarly, when controlling the supply voltage to decrease the supply voltage, an amount of the decrease can be dependent on a difference between the measure indicative of the monitored voltage and the predetermined upper reference.

The current produced by the current output DAC is dependent on a digital code being provided to an input of the DAC. In accordance with certain embodiments, the measure indicative of the voltage at the output of the DAC is only obtained, at step 402, when the digital code being provided to the input of the DAC is at least a predetermined value. This can be accomplished in various different ways, as was described above, and will be summarized below. In an embodiment, the digital code being provided or about to be provided to the input of the DAC can be monitored to thereby identify when the digital code being provided to the DAC is or will be at least the predetermined value, to thereby identify when step 402 is to be performed.

In certain embodiments, from time to time, the digital code provided to the input of the DAC is caused to be at least the predetermined value. Various ways of accomplishing this were described above. In certain embodiments, where light emitted by the light emitting element is used to produce a video image, the digital code provided to the input of the DAC is caused to be at least the predetermined value during blanking intervals so as to not affect the video image.

The foregoing description is of the preferred embodiments of the present invention. These embodiments have been provided for the purposes of illustration and description, but are not intended to be exhaustive or to limit the invention to the precise forms disclosed. Many modifications and variations will be apparent to a practitioner skilled in the art.

Embodiments were chosen and described in order to best describe the principles of the invention and its practical application, thereby enabling others skilled in the art to understand the invention. Slight modifications and variations are believed to be within the spirit and scope of the present invention. It is intended that the scope of the invention be defined by the following claims and their equivalents.

What is claimed is:

1. A method for use with a light emitting element that is driven by a current produced by a current output digital-to-analog converter (DAC), wherein the light emitting element or the DAC is powered by a supply voltage produced by a voltage supply, the method comprising:
   (a) obtaining a measure indicative of a voltage at an output of the DAC, wherein the voltage at the output of the DAC is indicative of a voltage headroom available for the DAC;
   (b) comparing the measure indicative of the voltage at the output of the DAC, obtained at step (a), to one or more predetermined references; and
   (c) controlling the supply voltage based on results of the comparing at step (b).

2. The method of claim 1, wherein:
   step (b) comprises comparing the measure indicative of the voltage at the output of the DAC to a predetermined reference; and
   step (c) comprises
      controlling the supply voltage to increase the supply voltage if the measure indicative of the voltage at the output of the DAC is less than the predetermined reference, and
      controlling the supply voltage to reduce the supply voltage if the measure indicative of the voltage at the output of the DAC is greater than the predetermined reference.

3. The method of claim 1, wherein at step (c):
   when controlling the supply voltage to increase the supply voltage, an amount of the increase is dependent on a difference between the measure indicative of the voltage at the output of the DAC and the predetermined reference; and/or
   when controlling the supply voltage to decrease the supply voltage, an amount of the decrease is dependent on a difference between the measure indicative of the voltage at the output of the DAC and the predetermined reference.

4. The method of claim 1, wherein:
   step (b) comprises comparing the measure indicative of the voltage at the output of the DAC to a predetermined upper reference and a predetermined lower reference; and
   step (c) comprises
      controlling the supply voltage to increase the supply voltage if the measure indicative of the voltage at the output of the DAC is less than the predetermined lower reference, and
      controlling the supply voltage to reduce the supply voltage if the measure indicative of the voltage at the output of the DAC is greater than the predetermined upper reference.

5. The method of claim 4, wherein at step (c):
   when controlling the supply voltage to increase the supply voltage, an amount of the increase is dependent on a difference between the measure indicative of the monitored voltage and the predetermined lower reference; and/or
   when controlling the supply voltage to decrease the supply voltage, an amount of the decrease is dependent on a difference between the measure indicative of the monitored voltage and the predetermined upper reference.

6. The method of claim 1, wherein the current produced by the current output DAC is dependent on a digital code being provided to an input of the DAC, and wherein:
   the obtaining of the measure indicative of the voltage at the output of the DAC, at step (a), is only performed when the digital code being provided to the input of the DAC is at least a predetermined value that is equal to or close to a maximum input code value.

7. The method of claim 6, further comprising:
   monitoring the digital code being provided or about to be provided to the input of the DAC to thereby identify when the digital code being provided to the DAC is or will be at least the predetermined value, to thereby identify when step (a) is to be performed.

8. The method of claim 6, further comprising:
   from time to time, causing the digital code provided to the input of the DAC to be at least the predetermined value.

9. The method of claim 8, wherein light emitted by the light emitting element is used to produce a video image, and wherein the causing the digital code provided to the input of the DAC to be at least the predetermined value is performed during blanking intervals so as to not affect the video image.

10. The method of claim 1, wherein:
    step (b) comprises comparing the measure indicative of the voltage at the output of the DAC to a predetermined reference; and
    step (c) comprises
       controlling the supply voltage to increase the supply voltage by a first amount if the measure indicative of the monitored voltage is less than the predetermined reference, and
       controlling the supply voltage to reduce the supply voltage by a second amount if the measure indicative of the voltage at the output of the DAC is greater than the predetermined reference,
    wherein the first amount is greater than the second amount.

11. The method of claim 10, wherein at least one of the first amount and the second amount is dependent on a difference between the measure indicative of the monitored voltage and the predetermined reference.

12. The method of claim 1, wherein:
    step (b) comprises comparing the measure indicative of the voltage at the output of the DAC to a predetermined upper reference and a predetermined lower reference; and
    step (c) comprises
       controlling the supply voltage to increase the supply voltage by a first amount if the measure indicative of the voltage at the output of the DAC is less than the predetermined lower reference, and
       controlling the supply voltage to reduce the supply voltage by a second amount if the measure indicative of the voltage at the output of the DAC is greater than the predetermined upper reference;
    wherein the first amount is greater than the second amount.

13. The method of claim 12, wherein the first amount is dependent on a difference between the measure indicative of the voltage at the output of the DAC and the predetermined lower reference, and/or the second amount is dependent on a difference between the measure indicative of the voltage at the output of the DAC and the predetermined upper reference.

14. The method of claim 1, wherein steps (a), (b) and (c) are each performed for a plurality of separate light emitting elements, each of which is driven by the current produced by a separate DAC.

15. The method of claim 1, further comprising tracking how long it has been since the supply voltage has been adjusted at step (c), and preventing any adjustment to the supply voltage for a specified period of time following a previous adjustment, to thereby improve loop stability.

16. The method of claim 1,
wherein the method is used with a plurality of separate light emitting elements, each of which is driven by a current produced by a separate one of a plurality of current output DACs,
wherein each of the plurality of light emitting elements or each of the plurality of the DACs is powered by the same supply voltage produced by the same voltage supply, and
wherein:
step (a) is separately performed for each of the light emitting elements, resulting in a separate measure indicative of the voltage at the output of the DAC for each of the DACs,
step (b) is separately performed for each of the light emitting elements, each of which has a corresponding predetermined reference; and
step (c) comprises
controlling the supply voltage to increase the supply voltage if at least one of the measures indicative of the voltages at the outputs of the DACs is less than its corresponding predetermined reference, and
controlling the supply voltage to reduce the supply voltage if each of the measures indicative of the voltages at the outputs of the DACs is greater than its corresponding predetermined reference.

17. A system, comprising:
a light emitting element;
a current output digital-to-analog converter (DAC) that drives the light emitting element;
a voltage regulator that produces a supply voltage, wherein the light emitting element or the DAC is powered by the supply voltage produced by the voltage regulator;
a voltage monitor that obtains measures indicative of a voltage at an output of the DAC, wherein the voltage at the output of the DAC is indicative of a voltage headroom available for the DAC; and
a controller that compares the measures indicative of the voltage at the output of the DAC to one or more predetermined references, and controls the supply voltage based on the comparisons.

18. The system of claim 17, wherein the current produced by the current output DAC is dependent on a digital code being provided to an input of the DAC, and wherein:
the voltage monitor obtains the measures indicative of the voltage at the output of the DAC only when the digital code being provided to the input of the DAC is at least a predetermined value.

19. The system of claim 17, further comprising:
circuitry that causes the digital code provided to the input of the DAC to be at least the predetermined value that is equal to or close to a maximum input code value.

20. The system of claim 19, wherein light emitted by the light emitting element is used to produce a video image, and wherein the circuitry causes the digital code provided to the input of the DAC to be at least the predetermined value during blanking intervals so as to not affect the video image.

21. The system of claim 17, further comprising:
a timer or counter that tracks how long it has been since the supply voltage has been adjusted;
wherein the timer or counter is used to prevent any adjustment to the supply voltage for a specified period of time following a previous adjustment, to thereby improve loop stability.

22. A sub-system for use with a system including a voltage regulator that produces a supply voltage, a light emitting element, and a current output digital-to-analog converter (DAC) that drives the light emitting element, wherein the light emitting element or the DAC is powered by the supply voltage produced by the voltage regulator, the sub-system including:
a voltage monitor that obtains measures indicative of a voltage at an output of the DAC, wherein the voltage at the output of the DAC is indicative of a voltage headroom available for the DAC; and
a controller that compares the measures indicative of the voltage at the output of the DAC to one or more predetermined references, and controls the supply voltage based on the comparisons.

23. The sub-system of claim 22, wherein the current produced by the current output DAC is dependent on a digital code being provided to an input of the DAC, and wherein:
the voltage monitor obtains the measures indicative of the voltage at the output of the DAC only when the digital code being provided to the input of the DAC is at least a predetermined value that is equal to or close to a maximum input code value.

24. The sub-system of claim 23, further comprising:
circuitry that causes the digital code provided to the input of the DAC to be at least the predetermined value.

25. The sub-system of claim 24, wherein light emitted by the light emitting element is used to produce a video image, and wherein the circuitry causes the digital code provided to the input of the DAC to be at least the predetermined value during blanking intervals so as to not affect the video image.

26. The sub-system of claim 22, further comprising:
a timer or counter that tracks how long it has been since the supply voltage has been adjusted;
wherein the timer or counter is used to prevent any adjustment to the supply voltage for a specified period of time following a previous adjustment, to thereby improve loop stability.

27. A system, comprising:
a light emitting element;
a current output digital-to-analog converter (DAC) that drives the light emitting element;
a voltage regulator that produces a supply voltage, wherein the light emitting element or the DAC is powered by the supply voltage produced by the voltage regulator; and
circuitry configure to obtain measures indicative of a voltage at an output of the DAC and control the supply voltage based on the measures;
wherein the voltage at the output of the DAC is indicative of a voltage headroom available for the DAC.

28. The system of claim 27, wherein a current produced by the current output DAC is dependent on a digital code being provided to an input of the DAC, and further comprising further circuitry configured to cause the digital code provided to the input of the DAC to be at least the predetermined value that is equal to or close to a maximum input code value.

29. The system of claim 28, wherein light emitted by the light emitting element is used to produce a video image, and wherein the further circuitry causes the digital code provided to the input of the DAC to be at least the predetermined value during blanking intervals so as to not affect the video image.

30. The system of claim 27, further comprising:
a timer or counter that tracks how long it has been since the supply voltage has been adjusted;
wherein the timer or counter is used to prevent any adjustment to the supply voltage for a specified period of time following a previous adjustment, to thereby improve loop stability.

* * * * *